United States Patent [19]

Auchincloss

[11] Patent Number: 5,096,580

[45] Date of Patent: Mar. 17, 1992

[54] IRON REMOVAL SYSTEM AND METHOD

[75] Inventor: Peter E. Auchincloss, Timonium, Md.

[73] Assignee: Hydrosource, Inc., Timonium, Md.

[21] Appl. No.: 672,752

[22] Filed: Mar. 21, 1991

Related U.S. Application Data

[63] Continuation of Ser. No. 410,060, Sep. 21, 1989, abandoned.

[51] Int. Cl.⁵ .................................................. C02F 1/64
[52] U.S. Cl. ........................................ 210/202; 210/209; 210/259; 210/295; 210/722
[58] Field of Search .................. 210/722, 264, 669, 279, 210/295, 665, 284, 290, 218, 259, 202, 668, 912, 209

[56] References Cited

U.S. PATENT DOCUMENTS

| | | | |
|---|---|---|---|
| 2,237,882 | 4/1941 | Lawlor et al. | 210/722 |
| 3,649,532 | 3/1972 | McLean | 210/722 |
| 4,430,228 | 2/1984 | Patersen | 210/669 |
| 4,534,867 | 8/1985 | Kreusch et al. | 210/722 |
| 4,659,463 | 4/1987 | Chandler et al. | 210/264 |
| 4,795,563 | 1/1989 | Auchincloss | 210/279 |
| 4,814,074 | 3/1989 | Auchincloss | 210/279 |
| 4,885,084 | 12/1989 | Doyle | 210/221.2 |
| 4,938,874 | 7/1990 | Auchincloss | 210/279 |
| 4,992,181 | 2/1991 | Siebert | 210/763 |

*Primary Examiner*—Stanley S. Silverman
*Assistant Examiner*—Cynthia L. Nessler
*Attorney, Agent, or Firm*—Michael L. Keller

[57] ABSTRACT

A system and method removes soluble iron from potable water by oxidation. It includes a pressure tank, an oxygen induction device and a filtration tank. Untreated water flows under pressure into the pressure tank, where the water is held for delivery to service. Upon demand, the untreated water leaves the pressure tank and flows into the oxygen induction device. The oxygen induction device mixes air with the untreated water using a venturi apparatus. This aeration causes an oxidation reaction to occur so that the soluble iron in the untreated water transforms into insoluble iron and precipitates. The aerated water then flows into a filtration tank where the oxidized iron precipitates are filtered out by a filtration media mix. Purified water is provided to service by the filtration tank. Backwashing of the filtration media is also provided to rejuvenate the media for prolonged use.

25 Claims, 3 Drawing Sheets

IRON REMOVAL SYSTEM AND METHOD

This is a continuation of application Ser. No. 07/410,060, filed Sept. 12, 1989 now abandoned.

BACKGROUND OF THE INVENTION

1. Field of the invention

This invention relates to systems and methods for removing soluble iron from household drinking water by oxidation.

2. Related Art

Well water often contains large amounts of soluble iron, commonly in the form of ferrous bicarbonate, which make the water less desirable for normal household use. Exposure to the air causes the ferrous bicarbonate to chemically oxidize, resulting in the formation of insoluble ferric hydrates. (Ferric hydrates include various oxidized iron compounds such as ferric oxide and ferric hydroxide.) These ferric hydrates, if not filtered out, will deposit on bathroom and kitchen fixtures, clothes or other surfaces, and create stains which are not attractive and are difficult to remove. Additionally, both the soluble ferrous bicarbonates and the insoluble ferric hydrates make the water taste bad.

Several methods for removing soluble iron from water are known. All of these have disadvantages that the present invention overcomes.

One such conventional system involves the use of chlorine to oxidize the soluble iron. Once the iron is rendered insoluble through this chemical oxidation process, a mechanical filtration device is used to remove the resulting insoluble ferric hydrates. This solution possesses many drawbacks which make operation of the system difficult for the homeowner. For example, the system requires a chemical feeder in which chlorine bleach has to be regularly applied. Additionally, the mechanical filter element tends to become supersaturated with iron hydrates and requires periodic media replacement.

A second conventional method involves the use of a cation exchange resin. This method is difficult to operate because the resin used in such a system must be periodically regenerated by treatment with aqueous sodium chloride to restore the iron-removing capacity of the resin. If the resin is not periodically regenerated, system performance will seriously degrade. Furthermore, the resin must be replaced regularly—an expensive and non-trivial task generally only done by a qualified contractor.

A third conventional method involved the use of an oxidation filter media such as manganese green sand. This method had disadvantages similar to the chlorine method—periodic regeneration of the manganese green sand was required to maintain the iron oxidizing capabilities of the media. Thus, a homeowner must periodically treat the green sand with potassium permanganate or with sodium hypochlorite, a potentially hazardous task. Potassium permanganate is a toxic, flammable substance that can leave residual stains on surfaces such as skin and clothing.

A fourth conventional method of removing soluble iron from household water involves the application of oxygen into the water through an aeration apparatus which causes oxidation of the iron, such that the resulting insoluble iron can be removed through mechanical filtration means.

The present invention includes oxidation for iron removal. Other systems that use oxidation are those shown in U.S. Pat. No. 3,649,532 to McLean, U.S. Pat. No. 4,430,028 to Paterson, and U.S. Pat. No. 4,659,463 to Chandler et al.

In the McLean system, the well water is pumped by a common well pump through a venturi-type apparatus which entrains air into the water. This air laden water is then introduced directly into a filter tank. This tank is shown to be disposed with a pressure switch and a pressure gauge. However, the tank itself does not appear to be disposed with means to pressurize water independent of the pump. Thus, no intermediate pressure tank is used. In fact, a purpose of the McLean system, as stated, is the obviation of a separate pressure tank. The venturi apparatus is designed to introduce only enough air into the water to cause the iron contained in the water to change into a colloidal form. Thus, the air intake is limited so as not to immediately oxidize the iron contained in the water stream.

The water with the iron in colloidal form passes into a filter tank and through the filtration bed contained in the filter tank. This filtration bed slowly raises the pH of the water passing thereto, which causes oxidation to occur according to a table noted in the McLean patent. The filtration bed simultaneously filters the ferric hydrates and other impurities therefrom. The McLean patent shows an air inlet that must be closely controlled in order to cause transformation of the soluble iron into colloidal form, without immediately inducing oxidation of the soluble iron.

The McLean system also shows an automatic air release valve which is provided to permit excess air drawn through the air intake to escape. The McLean system further shows a filter tank having a mineral bed resting on a course gravel underbed. The preferred mineral is dolomite, which itself consists of calcium and magnesium carbonate. This mineral is primarily responsible for raising the pH so that oxidation occurs. Significant drawbacks are readily apparent in the McLean system. Because the system uses no pressure tank, the pump must operate whenever water service is required. This will tend to decrease the life of the pump and thereby require more frequent replacement.

It should be noted that the present inventor is not aware of any commercial use of this system or other systems having no pressure tank.

The Paterson iron removal system includes an air injector in the water line between a common well pump and a common pressure tank. In the Paterson system, the iron in ferrous bicarbonate form is intentionally colloidally precipitated which results in enhanced particle surface charges for the colloidal particles. Thereafter, the air laden water with the charged iron particles is passed through a media bed carrying an opposite charge to attract the iron particles. The iron particles then electrostatically cling to the filter media. Note that the entire media bed depth is utilized for this electrostatic removal of iron particles. The Paterson system requires the air injector to be carefully set to control the amount of air introduced into the water. It also requires a specialized media bed preconditioned at the factory to have the opposite charge to the iron particles leaving the air injector.

The Paterson system also has serious drawbacks. If an improper amount of air is injected into the water, premature oxidation may occur. This would tend to clog the media blend and thereby severely reduce performance.

The Chandler system removes contaminates from water by introducing as much air as possible into the water to oxidize and precipitate the contaminants therein. A venturi nozzle assembly is employed in the Chandler system to maximize air input into the water with no special controls, adjustments or settings of the venturi assembly being required. Like Paterson, this venturi nozzle is piped into the system between a common well pump and a common pressure tank. One embodiment of this venturi assembly has a water bypass means normally closed by a dual layer diaphragm that flexes to allow additional water to enter. The system also incorporates an air venting assembly which includes a top manifold with an outlet selectively operative to vent excessive air from the tank while maintaining system pressure.

The Paterson and Chandler systems have many other common disadvantages. Because the aeration devices are located between the pump and the pressure tank, the installation time is greater than a system which does not require the aeration device to be placed between the pump and the pressure tank. Also, because the aeration devices are piped in line upstream from the pressure tank, the iron begins to oxidize while it is in the pressure tank. This leaves a residue of ferric hydrates which tend to clog the pressure switch and the pressure gauge which are attached to the pressure tank. This results in increased maintenance and parts replacement costs. Additionally, the residue from the iron oxidation tends to coat the inside of the pressure tank and decrease the efficiency thereof.

The Chandler and Paterson systems were confined to such an aerator placement because conventional aerator devices require 50 PSI and 8 to 10 gallons per minute of water flow in order to draw an acceptable amount of air. Because the output of common pressure tanks is in the range of 30-50 PSI (nominal 40 PSI), conventional aerators function properly only if they are piped in line between the well pump and the pressure tank.

Other systems and methods which involve the removal of iron from water appear to be described in U.S. Pat. No. 1,900,214 to Zapffe, U.S. Pat. No. 2,237,882 to Lawlor, and U.S. Pat. No. 4,534,867 to Kreusch et al.

SUMMARY OF THE INVENTION

The system and method removes soluble iron from potable water by oxidation. In a preferred embodiment, the present invention can remove up to 25 parts per million soluble iron and up to 10 parts per million hydrogen sulfide from household well water for a well having a pH in the ranges of 5.5 to 8.0 and a turbidity of no greater than 125 parts per million.

The present invention includes a pressure tank, an oxygen induction device and a filtration tank. Untreated (raw) water from the well pump flows under pressure into the pressure tank, where the water is held for delivery to service. Upon demand, the untreated water leaves the pressure tank and flows into the oxygen induction device. The oxygen induction device mixes air with the untreated water using a venturi apparatus. This aeration causes an oxidation reaction to occur so that the soluble iron in the untreated water transforms into insoluble iron and precipitates. The oxygen induction device preferably is physically disposed adjacent to the filtration tank so as to minimize build up of oxidized iron on the interior of the oxygen induction device or in the conduit or pipe fluidically connecting the oxygen induction device to the filtration tank.

The aerated water then flows into a filtration tank where the oxidized iron precipitates and is filtered out by a filtration media mix disposed above a gravel underbed. Preferred components of the filtration media mix are insoluble, catalyst non-hydrous aluminum silicate, magnesium oxide, and calcium carbonate. A preferred mixture by weight of the filtration media is approximately 52% insoluble catalyst, 17% non-hydrous aluminum silicate, 7% magnesium oxide and 24% calcium carbonate. A preferred minimum amount of the filtration media mix in the filtration tank is 1.5 cubic feet where the filtration tank has dimensions of diameter no less than 10 inches and a height no less than 54 inches. Purified water after filtration is provided to service by the filtration tank.

In a preferred embodiment, the iron content of the water leaving the filtration tank is 0.3 ppm or less, the hydrogen sulfide content of the water leaving the tank is 0.5 ppm or less, the pH of the water leaving the tank is approximately chemically neutral at 7.0 and the turbidity of the water leaving the tank is less than 1 ppm, when the iron content of the water entering the pressure tank is 25 ppm or less, the hydrogen sulfide content of the water entering the tank is 10 ppm or less, the pH of the water entering the pressure tank is between 5.5 and 8.0, and the turbidity of the water entering the pressure tank is 125 ppm or less.

Backwashing of the filtration media is also provided to rejuvenate the media for prolonged use.

BRIEF DESCRIPTION OF THE DRAWINGS

The invention will be better understood if reference is made to the accompanying drawings, in which.

DETAILED DESCRIPTION OF THE PREFERRED EMBODIMENTS

Figure 1:
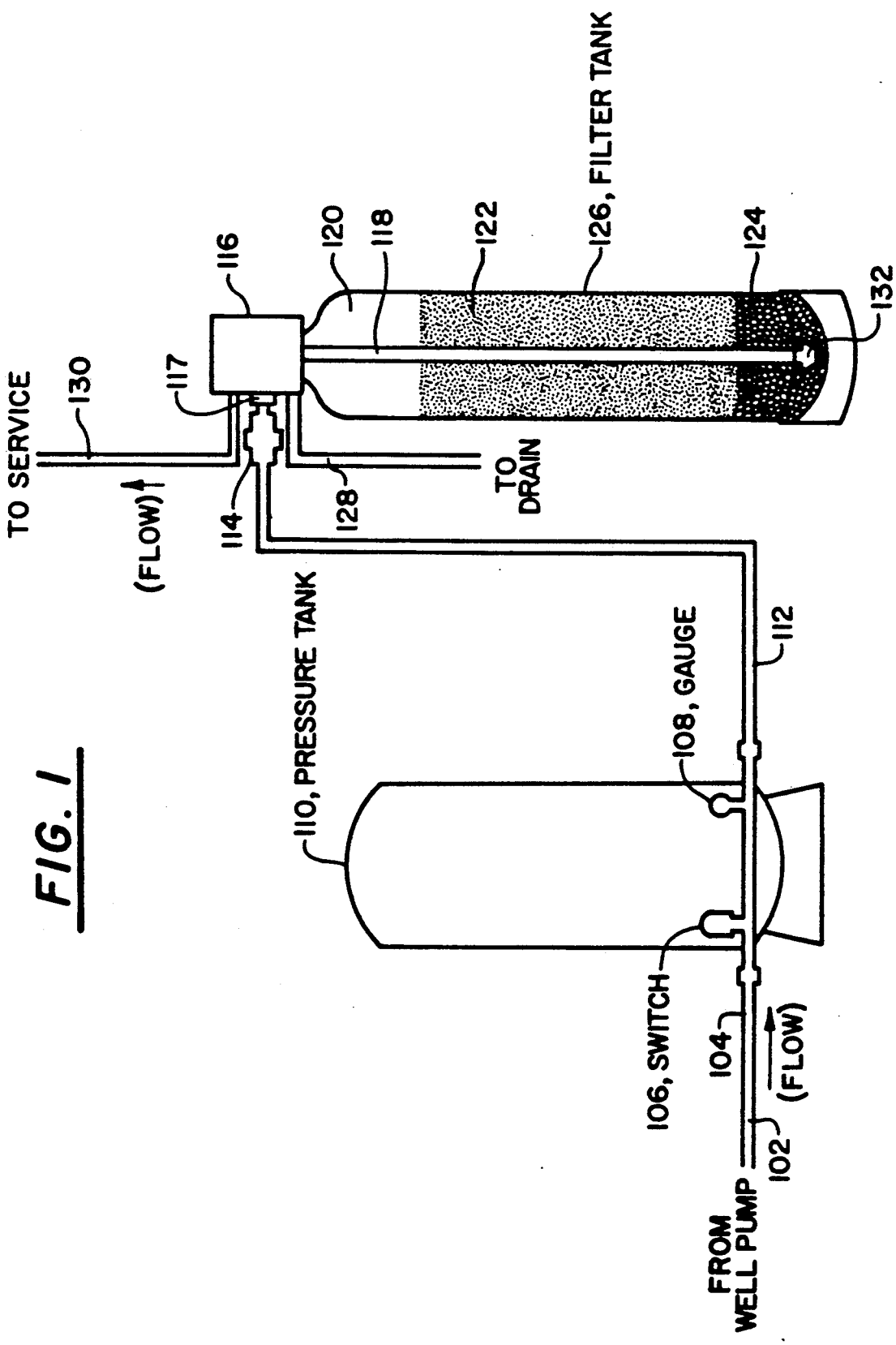
FIG. 1 shows a schematic diagram of the present iron removal system and method of the present invention with its associated connections and components.

The present invention eliminates disadvantages of the conventional systems, and serves generally as a more effective system and method for removing iron from water for household use.

The inventor of the present invention realized the limitations of conventional systems, especially those which utilized conventional aeration devices, and therefore sought to invent a system which would eliminate these drawbacks. The inventor realized the need for a separate pressure tank and therefore rejected the McLean one tank system. The inventor also sought to solve the disadvantages of the Chandler and Paterson systems, such as clogging of the pressure tank and its associated pressure switch and gauge by the insoluble iron, and the significant installation time associated with placing an air injector device between the well pump and the pressure tank.

The inventor thereby experimented with placements of aeration devices downstream from the the pressure tank in the direction of service, that is, between the pressure tank and the filtration tank. The inventor theorized that if the aeration device were placed downstream from the pressure tank, there would be no build up of oxidized (insoluble) iron in the pipes or pressure tank which occurs in conventional systems. The inventor believed that such a design would eliminate the clogging by insoluble iron of the pressure switch and gauge. He also believed that this design would also eliminate the buildup of insoluble iron in the pressure tank. He believed that his design would require less installation cost and less maintenance cost.

Initial experimentation by the inventor of his design, however, revealed that a conventional aeration device resulted in poor system and method performance. The water output of a pressure tank as noted above is only nominal 40 PSI, which turned out to be an inadequate amount of pressure to drive conventional aerator units. Thus, too little air was drawn into the untreated water and inadequate oxidation of the soluble iron and filtration resulted.

The inventor discovered that low pressure was not the only reason that conventional aeration devices failed when placed downstream from the pressure tank. Flow rate was also found to be a problem. Conventional aeration devices require 8-10 gallons per minute flow rate in order to draw adequate air into the water for proper oxidation. This flow rate would generally only exist in the pipe between the pump and the pressure tank (that is, upstream from the pressure tank). On the downstream side of the pressure tank, not only would the pounds per square inch be nominally 40 PSI, but the gallons per minute flow rate would be dependent upon water use in the household. For example, an average bathroom faucet has a flow rate of approximately 2 gallons per minute. Thus, if a conventional aeration device was placed downstream from the pressure tank, virtually no iron removal would occur unless there were numerous faucets in use at the same time in the household. This was clearly not acceptable to potential consumers. Therefore, aeration devices were placed upstream from the pressure tank in conventional systems.

It was during the experimental testing of the present invention, that these limitations on conventional aerators were discovered by the inventor. Therefore, it was determined that in order to remove the deleterious effects of an upstreamed placed aerator (as in Chandler and Paterson), a new and better aerator would have to be developed. The inventor then determined the specific requirements that an aerator would be required to have in order to function properly downstream from the pressure tank. As noted above, the aerator would have to draw adequate air at a water flow rate of less than two gallons per minute. Furthermore, the aerator would have to function adequately between 30 and 50 PSI.

The inventor of the present system conferred with aerator manufacturers and requested the construction of a new aerator which would meet the specifications required. After one prototype failure, an aeration device was built which conformed to the inventor's specifications. This new aeration device is included in the present invention as the air induction means. The present invention is also innovative because no air release valve is required to vent excess air from the system.

Turning now to the present invention, FIG. 1 depicts the water treatment system and method of the present invention in diagrammatic form. As shown in FIG. 1, the flow of water from the well (or other source) at a point 102 of a waterline 104 is passed into a pressure tank 110. This raw (untreated) water entering the pressure tank 110 is delivered under pressure by a conventional pump which is not shown.

The pressure tank 110 is a vessel for storing water under pressure for subsequent delivery to service, and is well known in the art. Any suitable pressure tank 110 can be used. By thus storing under pressure, the pump (not shown) does not need to operate upon every service demand. The pressure tank 110 includes a means to maintain a pressure of a minimum preselected level. A common such means is a diaphragm apparatus which is well known in the art. As an example, a pressure of at least 30 PSI in the system is commonly used by the present invention. The well pump has a capacity to deliver water at a pressure of a maximum value. A representative value for the output of the well pump is approximately 50 PSI. The water delivered by the well pump enters the pressure tank 110 and ultimately increases the pressure therein to the (50 PSI) level. At this point, a pressure switch 106 of conventional design disposed in pressure tank 110 shuts off the pump through a conventional electrical feedback system (not shown) so as to prevent overpressurization of pressure tank 110.

When water is drawn from pressure tank 110 for filtration and service, the water pressure in pressure tank 110 decreases. This decrease in pressure is monitored by pressure switch 106. When the water pressure in pressure tank 110 decreases to the minimum value (30 PSI), the pressure switch 106 activates the pump to deliver additional water under pressure to the pressure tank 110 to again increase the water pressure in the pressure tank 110 (to at least 50 PSI). The pressure of the water being delivered from pressure tank 110 to the system for service can be and is continually monitored by a pressure gauge 108 of conventional design.

Upon demand from service, the water flows out of the pressure tank 110 and into a pipe 112, which feeds it to an oxygen induction device 114. In a preferred embodiment, the oxygen induction device 114 is physically disposed adjacent to a filtration tank 126. Such a close physical arrangement reduces the buildup of iron hydrates (also called insoluble iron) in the pipe 112, a bypass valve 117, and a control assembly (valve) 116. The water entering the oxygen induction device 114 has air introduced therein by suction created in a venturi jet assembly 236 by the water flow, as is discussed in detail below.

Figure 2:
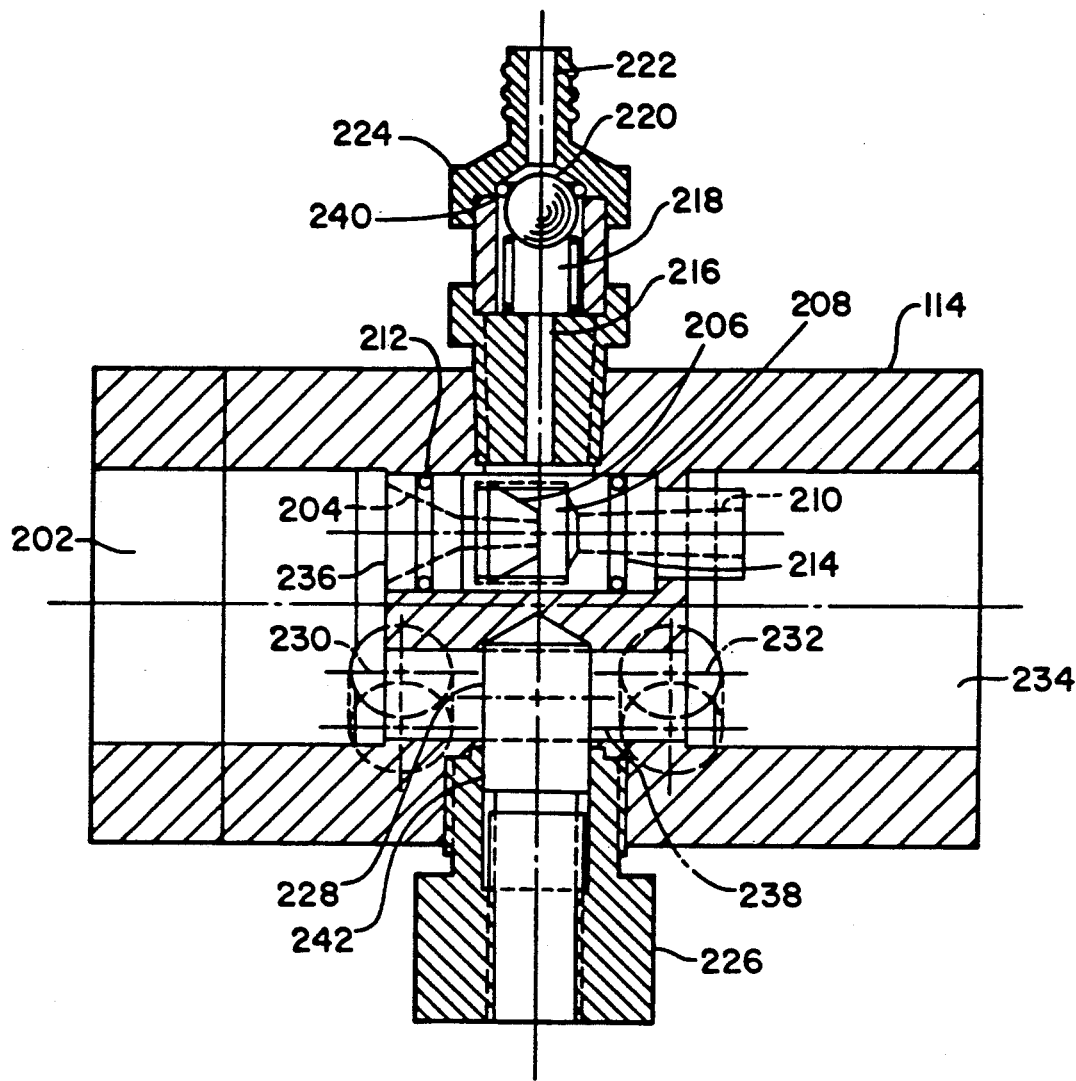
FIG. 2 shows a cross sectional side view of the air induction apparatus of the present invention.
Figure 3:
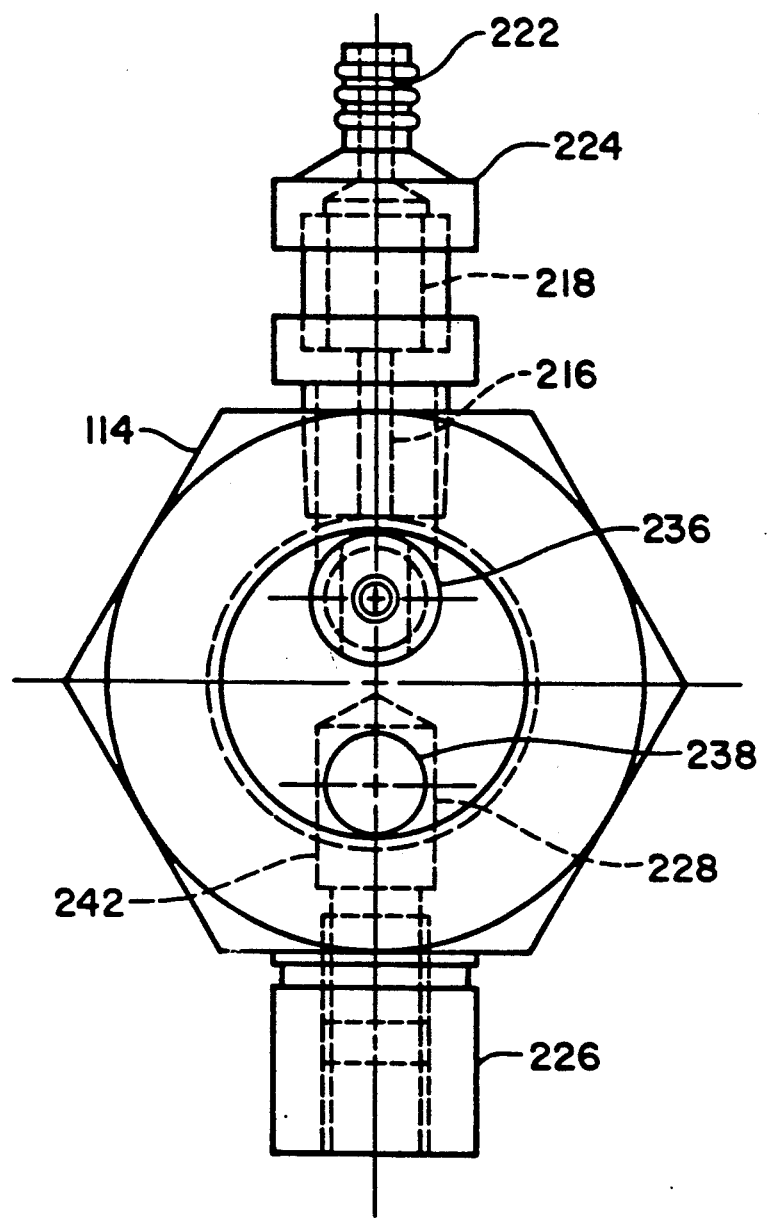
FIG. 3 shows a cross sectional front view of the air induction apparatus of FIG. 2.

A preferred embodiment of oxygen induction device 114 is shown in FIGS. 2 and 3. This embodiment is commercially available from the Clack Corporation of Windsor, Wis. and from Hydro-master Parts Co. Inc. of Oswego, Ill. The purpose of oxygen induction device 114 is to induce aeration of the water which causes oxidation of the soluble iron. Once oxidized, the soluble iron precipitates, and the insoluble iron can be filtered out.

Referring now to FIGS. 2 and 3, water enters a water inlet 202 and flows towards a venturi jet assembly 236. Upon reaching the venturi jet assembly 236, the water enters a cone nozzle 204 and passes through the cone nozzle 204 to reach a venturi jet 206. The water exits the venturi jet 206 and enters a suction chamber 208. At this point, a venturi effect is created, which causes suction to be applied to a suction inlet 216. This suction pulls a ball 220 from a sealing gasket 240. This movement of ball 220 away from seating with sealing gasket 240 allows air to enter an air flow passage 222 and pass downward through an air inlet assembly 224, thus reaching the suction chamber 208 and mixing with the water to produce aerated water. The aerated water exits the suction chamber 208 and passes through a diffuser 210. The aerated water then exits diffuser 210 and enters a water outlet 234, where it is passed out of the oxygen induction device 114. O ring gaskets 212 and 214 secure the venturi jet assembly 236 so that substantially no water leakage occurs around the assembly.

In a preferred embodiment, the oxygen induction device 114 draws the amount of air required at a water flow rate of 1.5 gallons per minute to create a solution of substantially 15% dissolved oxygen to iron. The inventor has discovered that at least a 15% solution of dissolved oxygen to iron is required for proper oxidation of the soluble iron. Conventional aeration devices generally require a higher water flow rate in order to draw enough air to create a 15% solution of dissolved oxygen to iron.

In some household applications, a greater flow of water is needed to satisfy demand. As an example, one average household faucet draws approximately 1.5 gallons of water per minute. In a multi-person household, many such faucets may simultaneously be drawing water. In a preferred embodiment of the present invention, 4.5 gallons of water (or approximately three faucets) may be drawn with no more than a 10 psi loss in pressure. Flow rates greater than 4.5 gallons per minute will cause a proportional increase in pressure loss which will eventually decrease the flow rate per faucet to an unusable level.

As more fully described below, a preferred embodiment of the present invention comprises means which will provide a flow rate of up to 9 gallons of water per minute with no more than a 10 psi pressure loss. Referring again to FIGS. 2 and 3, when a greater flow rate of the water is needed, a bypass orifice 238 may be opened by unscrewing a bypass orifice blocking screw 228 which under normal operation is seated in a bypass orifice blocking screw chamber 242.

In a preferred embodiment, the bypass orifice blocking screw 228 must be retracted by rotating the bypass orifice blocking screw 228 counterclockwise three complete revolutions. This retraction serves to unblock the bypass orifice 238. When the bypass orifice 238 is unblocked, water entering the water inlet 202 enters a bypass orifice inlet 230 as well as the venturi jet assembly 236. Water thus simultaneously passes through the bypass orifice 238 and the venturi jet assembly 236. The water passing through the bypass orifice 238 exits at a bypass orifice outlet 232 and enters the water outlet 234 where it rejoins the water that had simultaneously passed through the venturi jet assembly 236. The inventor has discovered that adequate air is inducted into the total flow of water even when this bypass orifice 238 is open. Thus, increased water flow can be provided with no degradation in the iron removal performance of the system and method of the present invention.

Referring again to FIG. 1, the aerated water leaving the oxygen induction device 114 then enters the filtration tank 126 through the bypass valve 117 and the control assembly 116. The bypass valve 117 (which is well known in the art) allows the filtration tank 126 to be removed from the system so that maintenance may be applied thereto As will be described further below, this maintenance includes replacement of certain parts of a filtration media 122. The bypass valve 117 thus shortens the time required for periodic maintenance of the filtration tank 126. The bypass valve 117 is commercially available from Amtrol Corp. of Milwaukee, Wis. A preferred embodiment is Amtrol's Model 05 Bypass.

The control assembly 116 provides mode control for the filtration tank 126 and is also well known in the art. The control assembly serves to change operational mode from normal to backwash, described further below. The control assembly 116 is also commercially available from Amtrol Corp.; a preferred embodiment is Amtrol's Series 163.

The filtration tank 126 is used to conduct the aerated water and includes a mix of filtration media 122, and a gravel underbed 124. In a preferred embodiment, the filtration tank 126 has a minimum diameter of 10 inches and a minimum height of 54 inches. Such a preferred filtration tank 126 is available from Structural Fibers Corp. of Chardon, Ohio.

The filtration media 122 disposed above the gravel bed 124 in filtration tank 126 is comprised of one or more substances which remove iron precipitates from the water, thus treating and purifying the water. In a preferred embodiment, the filtration media 122 comprises by weight approximately 52% insoluble catalyst, 17% non-hydrous aluminum silicate, 7% magnesium oxide, and 24% calcium carbonate. The insoluble catalyst material is commercially available from the Clack Corporation of Windsor, Wis. under the trademark BIRM. Non-hydrous aluminum silicate is available from the Clack Corporation under the trademark Filter Ag. Magnesium oxide is available from the Clack Corporation under the trademark Corosex. Calcium carbonate is available from Hydrosource Inc. of Timonium, Md. under the trademark Hydroflo Calcite. A preferred minimum amount of the filtration media 122 in the filtration tank 126 is 1.5 cubic feet.

In this filtration media 122, the insoluble catalyst material acts to convert ferrous oxides to ferric hydroxides for precipitation and removal. The non-hydrous aluminum silicate material is light-weight, irregular in size, and acts as a mechanical filter. The magnesium oxide and calcium carbonate act to raise the water pH to a desirable level. Both the magnesium oxide and the calcium carbonate are "sacrificial" media and thus must be replaced every 6-12 months, depending on use. These replacement materials are available from Hydrosource Inc. It should be noted that the homeowner is qualified to replace these materials, thus alleviating any need for professional maintenance of the present invention.

The gravel underbed 124, which is well known in the art and available from Clack Corp., is disposed below the filtration media 122 and serves to shield a distributor tube screen 132 so that filtration media 122 cannot enter the distributor tube screen 132. This gravel underbed 124 also distributes the water flow to provide a well dispersed and uniform flow. The filtration tank 126 also includes a distributor tube 118 and a prescribed amount of tank freeboard 120. This distributor tube 118 is well known in the art and commercially available from Great Lakes International Corp. of Racine, Wis. The freeboard 120 is located inside and at the top of the filtration tank 126, and constitutes that part of the filtration tank 126 where no filtration media 122 is disposed. The freeboard 120 is used as surge space to accomodate expansion of the filtration media, necessary in backwash operation, as described more fully below.

In normal (filter) operation, the control assembly 116 directs the flow of water into the freeboard area 120 of the filtration tank 126. The water then passes down through the filtration media 122 which removes the oxidized iron compounds, and further through the gravel underbed 124. The water then enters the distributor tube 118 through the distributor tube screen 132. The distributor tube screen 132 is disposed at the bottom of the distributor tube 118 which is disposed at the bottom of the gravel underbed 124. The purified water then travels up the distributor tube 118 and reenters the control assembly 116, where it is directed into a service line 130 for delivery to the household.

It should be noted that no air release valve is required in the present invention because no excess air is drawn into the system by the oxygen induction device 114.

In a preferred embodiment, the iron content of the water leaving the filtration tank 126 is 0.3 ppm or less, the hydrogen sulfide content of the water leaving the filtration tank 126 is 0.5 ppm or less, the pH of the water leaving the filtration tank 126 is approximately chemically neutral at 7.0 and the turbidity of the water leaving the filtration tank 126 is less than 1 ppm, when the iron content of the water entering the pressure tank 110 is 25 ppm or less, the hydrogen sulfide content of the water entering the pressure tank 110 is 10 ppm or less, the pH of the water entering the pressure tank 110 is between 5.5 and 8.0, and the turbidity of the water entering the pressure tank 110 is 125 ppm or less.

When the filtration media 122 becomes clogged with removed iron precipitates, the filtration media 122 can be backwashed and thus rejuvenated. This backwash operation is as follows. The control assembly 116 is automatically actuated so that the filtration tank 126 operates in the backwash mode. In this backwash mode, water entering the control assembly 116 from the oxygen induction device 114 is passed not through the filtration media 122, but instead down through the distributor tube 118, thus reversing the flow of normal (that is, filter) operation. The water then exits the distributor tube 118 at the distributor tube screen 132 and travels backwards up through the gravel underbed 124 and filtration media 122, rising up to the freeboard area 120. The water, which now has removed and collected iron hydrates suspended in it, passes into the control assembly 116 which directs the water with hydrates in suspension into a drain line 128 for disposal. In this way, filtration media 122 is cleaned of the iron hydrates.

The invention now being fully described, it will be apparent to one of ordinary skill in the art that many changes and modifications can be made thereto without departing from the spirit or scope of the invention as set forth below.

What is claimed is:

1. A system for removing up to 25 parts per million of soluble iron and up to 10 parts per million of hydrogen sulfide from household well water from a well having a pH in the range of 5.5 to 8.0 and a turbidity of no greater than 125 parts per million consisting essentially of,
   (a) a pressure tank for pressurizing the well water;
   (b) means for pumping said well water to said pressure tank;
   (c) an in-line venturi jet assembly for aerating said well water thus causing soluble iron to oxidize and precipitate, and wherein said venturi jet assembly is capable of functioning so as not to introduce excess air into the water flow stream at water flow rates of less than two gallons per minute and at a water pressure of between 30 and 50 psi;
   (d) means for passing said pressurized water from said pressure tank to said venturi jet assembly;
   (e) a filtration tank having a mixture of filtration media in specific proportions for filtering out substantially all of said precipitated iron thereby producing treated water;
   (f) means for passing said aerated well water to said filtration tank; and
   (g) means connected to said filtration tank for passing said treated water to a household water supply line.

2. The system of claim 1, wherein said filtration tank has dimensions of a minimum diameter no greater than 10 inches and a minimum height of 54 inches.

3. The system of claim 1, wherein the minimum amount of said filtration media in said filtration tank is 1.5 cubic feet.

4. The system of claim 1, wherein said venturi jet assembly draws the amount of air required at 1.5 gallons of water per minute to create a solution of substantially 15% dissolved oxygen to iron.

5. The system of claim 1, wherein a loss of no more than a 10 psi loss at a flow rate of 4.5 gallons per minute occurs between element (b) and element (h).

6. The system of claim 1, wherein one component of said filtration media is insoluble catalyst.

7. The system of claim 1, wherein one component of said filtration media is non-hydrous aluminum silicate.

8. The system of claim 1, wherein one component of said filtration media is magnesium oxide.

9. The system of claim 1, wherein one component of said filtration media is calcium carbonate.

10. The system of claim 1, wherein the filtration components of said filtration media consist of insoluble catalyst, non-hydrous aluminum silicate, magnesium oxide, and calcium carbonate.

11. The system of claim 1, wherein said filtration tank has an underbed of gravel disposed below said filtration media.

12. The system of claim 1, wherein said venturi jet assembly has a bypass orifice which provides for a flow rate of up to 9 gallons per minute at 10 psi loss.

13. The system of claim 12, wherein said bypass orifice is adjusted for desired operation by turning a screw three complete revolutions.

14. A system for removing soluble iron from potable water which comprises:
   (a) a pressure tank for pressuring the water;
   (b) means for filtering the water;
   (c) oxygen induction means for entraining air into the water to oxidize and precipitate the soluble iron;
   said oxygen induction means is a venturi jet assembly fluidically connected downstream from said pressure tank for pressurizing the water and fluidically connected upstream from said means for filtering the water, whereby said means for filtering provides potable water substantially without soluble iron and wherein no means for entraining air into the water to cause precipitation of the soluble iron is disposed prior to said pressure tank, and wherein said venturi jet assembly is operable at a water flow rate of less than two gallons per minute at a water pressure between 30 and 50 psi.

15. The system of claim 14, wherein said means for pressurizing the water comprises a pressure tank.

16. The system of claim 14, wherein the iron content of the water leaving said means for filtering is 0.3 ppm or less, the hydrogen sulfide content of the water leaving said means for filtering is 0.5 ppm or less, the pH of the water leaving said means for filtering is approximately chemical neutral at 7.0 and the turbidity of the water leaving said means for filtering is less than 1 ppm when:

the iron content of the water entering said means for pressurizing is 25 ppm or less;

the hydrogen sulfide content of the water entering said means for pressurizing is 10 ppm or less;

the pH of the water entering said means for pressurizing is between 5.5 and 8.0; and the turbidity of the water entering said means for pressurizing is 125 ppm or less.

17. The system of claim 14, wherein said oxygen induction means comprises means for drawing an amount of air necessary to create a solution of substantially 15% dissolved oxygen to iron at a water flow rate of 1.5 gallons per minute.

18. The system of claim 14, wherein between said means for pressurizing and said means for filtering there is no more than a 10 psi loss in pressure at a flow rate of 4.5 gallons per minute of the potable water.

19. The system of claim 14, wherein said oxygen induction means functions so as not to introduce excess air into the water flow.

20. The system of claim 14, wherein said oxygen induction means includes a cone nozzle that is cross-sectionally cone-shaped.

21. The system of claim 14, wherein said oxygen induction means includes bypass orifice means for providing a flow rate of up to 9 gallons per minute of said potable water at 10 psi loss.

22. The system of claim 21, wherein said bypass orifice means is adjusted for desired operation by turning a screw three complete revolutions.

23. The system of claim 14, wherein said means for filtering the water comprises a control valve, a filtration tank, and a gravel underbed and filtration media disposed in said filtration tank, said filtration media comprising by weight approximately 52% insoluble catalyst, 17% nonhydrous aluminum silicate, 7% magnesium oxide and 24% calcium carbonate.

24. The system of claim 23, wherein said filtration tank has dimensions of diameter no greater than 10 inches and height no greater than 54 inches.

25. The system of claim 23, wherein the minimum amount of said filtration media in said filtration tank is 1.5 cubic feet.

* * * * *